Nov. 14, 1944.  R. T. CLOUD  2,362,616
PENDULUM COMPENSATOR
Filed Oct. 10, 1942  2 Sheets-Sheet 1

Inventor:
Raymond T. Cloud,
By: Paul F. Hawley
Patent Agent

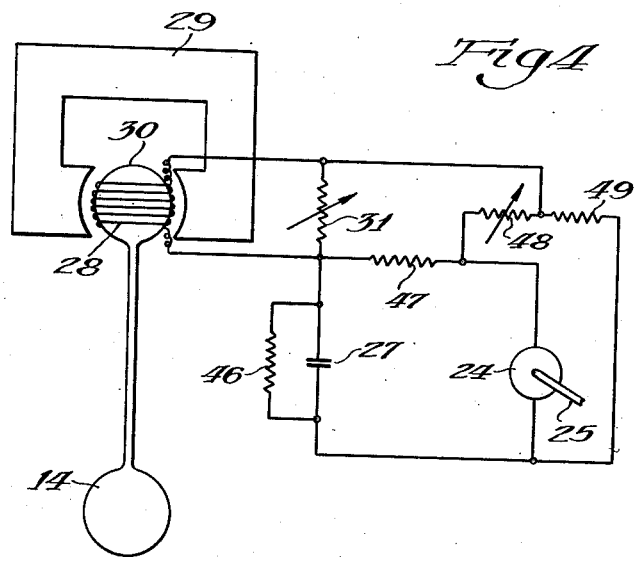
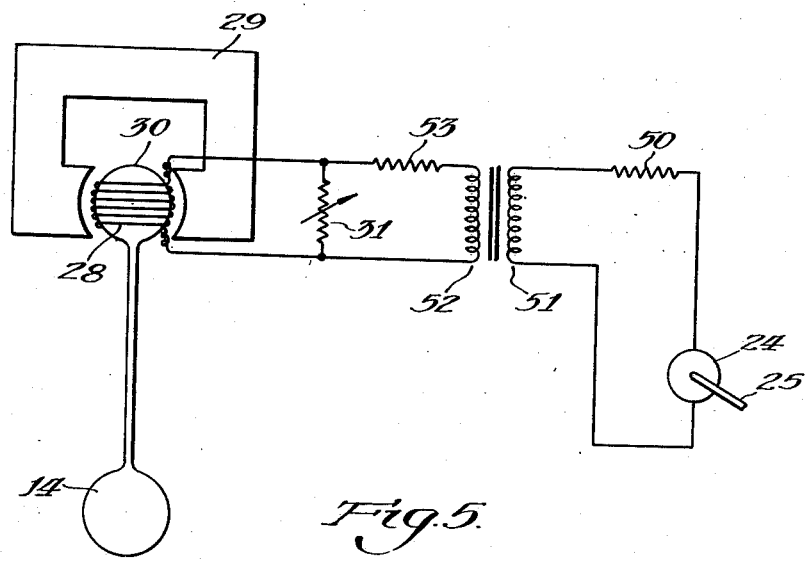

Patented Nov. 14, 1944

2,362,616

UNITED STATES PATENT OFFICE 2,362,616

PENDULUM COMPENSATOR

Raymond T. Cloud, Tulsa, Okla., assignor to Stanolind Oil and Gas Company, Tulsa, Okla., a corporation of Delaware Application October 10, 1942, Serial No. 461,625

6 Claims. (Cl. 33—220)

This application relates to the art of pendulum compensation and has particular reference to the application of such compensation in the operation of mobile devices for measuring differences in altitude.

A device has recently been perfected by means of which it is possible to measure continuously differences in altitude between points on a path traversed by a mobile vehicle or the like. This device is based on the fact that if a pendulum is mounted upon a vehicle in such a manner that its axis of support is transverse to the direction of travel of the vehicle, then the angle between the center line of the pendulum and the wheel base of the vehicle in a fore and aft direction will be the same as that of the surface over which the vehicle is traveling with respect to the same reference line; namely, the vertical.

It can also readily be seen that the angle between a line normal to the wheel base of the vehicle and the center line of the pendulum will be a measure of the angle of the surface on which the vehicle stands and the horizontal plane.

Now if the said vehicle is driven over the surface of the ground at a constant speed from a given point to another point, the line normal to the wheel base will at all times assume angles equal to those of the surface with respect to the horizontal plane, at every given instant during the period of travel.

Accordingly if the sine of this measured angle is multiplied by the increment of distance traveled at this particular angle the resultant is the increment of elevation for the distance traveled. Where the angle varies from point to point along the path of travel the summation of all the products of the sines of the angles with the distance traveled gives the difference in elevation between two points.

If the summation is algebraic the result is unaffected by the direction of the inclination and is independent of the path taken in traversing the vehicle between the two points.

It is, of course, impossible to drive a vehicle between two points at constant speed especially when starting and stopping at the end points, so that the pendulum will be deviated from the vertical line by the acceleration and deceleration of the car thus resulting in errors unless compensation is provided to offset such errors. In order to accomplish this result various means have been tried. For example, the period of the pendulum can be made extremely long so that the reaction of such a pendulum to a shock of relatively short duration is small. Likewise such pendula can be damped electrically or mechanically in order to minimize oscillation. However, such devices can operate only after the shock has been administered to the pendulum and cannot immediately reduce the shock oscillation to zero. Since extremely small motions of such a pendulum can result in relatively large inaccuracies in the measurement of elevation (as they may persist over a relatively long period of time), it is apparent that there is a definite need for a device which will substantially eliminate the effect of such a shock upon the pendulum, thus keeping it always substantially vertical.

It is the purpose of this invention to supply means for compensating for the inertia forces acting on a pendulum due to acceleration or deceleration of the pendulum mount, in order that its position may be relatively unaffected by forces either due to conditions of the path on which the vehicle is traveling or due to intentional changes in speed of such vehicle. This last, of course, is of considerable importance when it is considered that there is a large and relatively sustained force in the direction of the vehicle travel applied when the car is first started or when there is a substantial change in speed. It is a further object of this invention to provide a device for eliminating the effect of shock on pendula or similar suspended articles mounted in mobile vehicles, which is absolutely automatic in its action with respect to the degree of acceleration applied thereto and which operates in synchronism with the applied inertia forces. Further objects and advantages of the invention will be apparent from this specification.

Certain illustrations of the invention are attached to this specification and made a part thereof. These drawings illustrate one particular embodiment of my invention applied in an elevation recorder. In these figures:

Figures 4 and 5 represent in schematic form diagrams of alternative circuit elements used to carry out the invention.

Figure 1:
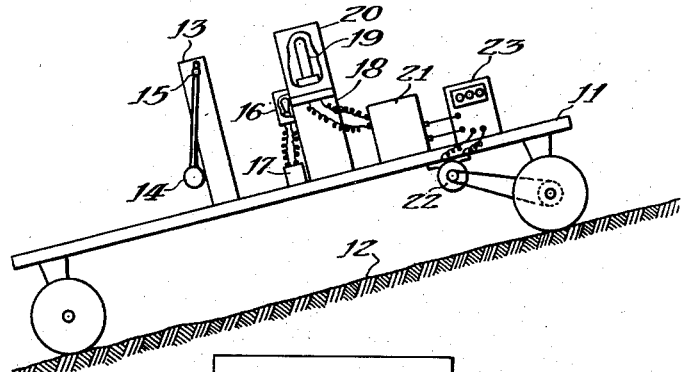
Figure 1 represents a vehicle carrying a simple type of elevation indicator.
Figure 3:
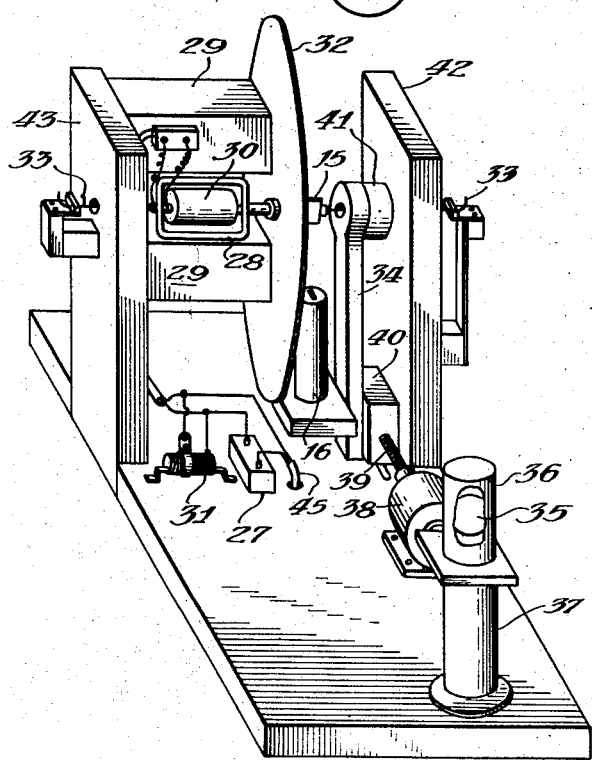
Figure 3 shows an oblique view of one form of the invention as applied to a particularly advantageous type of elevation control.

In Figure 1 a vehicle 11 is shown traversing a path 12 which is inclined to the horizontal. Mounted on the vehicle on a support 13 is a pendulum 14 which is mounted to rotate about an axis substantially transverse to the direction of motion of the vehicle, as shown in Figure 3. Attached to the pendulum is a mirror 15 which moves with the pendulum 14 as it rotates to assume a vertical position. A shielded electric lamp 16 supplied from a battery 17 is mounted on a second support 18 so that a restricted beam of light shines on the mirror 15. Light from this mirror is reflected onto a photoelectric cell 19 mounted in a shield 20 attached to the support 18 so that as the mirror 15 moves, more or less light is admitted to the photocell, depending on the inclination of the path 12. The output from the photocell passes to the amplifier 21, which produces an output current directly proportional to the amount of illumination reaching the photocell 19. A direct current generator 22 is driven from one of the wheels of the vehicle 11 so that its output voltage is directly proportional to the speed of the vehicle. The current from amplifier 21 and the voltage from generator 22 are applied to the current and voltage coils respectively of an indicating or recording watt hour meter 23. The product of the current times the voltage times the time is automatically produced on the record of the wattmeter 23. This product is directly proportional to the difference in elevation as the vehicle progresses since the product of the voltage (proportional to velocity) and time is a quantity directly proportional to the distance traveled. This in turn is multiplied constantly by a quantity proportional to the angle of inclination of the vehicle relative to the horizontal and (since the sine of the angle is proportional to the angle and vice versa) for angles that will be encountered on such roads, it is apparent that the resultant reading must be proportional to the distance times the sine of the angle, i. e. is proportional to the difference in elevation.

This is true, however, only in case the acceleration of the vehicle itself is substantially zero. However, if there is any appreciable acceleration there is an inertia force applied to the pendulum tending to change the angle of inclination of the pendulum relative to its support. This would automatically cause an erroneous indication on the watt hour meter, as if the vehicle were climbing at a rate greater than is actually the case. In order to eliminate this inherent error in such a system it is necessary to provide the pendulum with automatic compensation means which will apply a torque in the opposite direction equal in magnitude to the inertia torque which is applied to the pendulum due to the acceleration of the vehicle.

Figure 2:
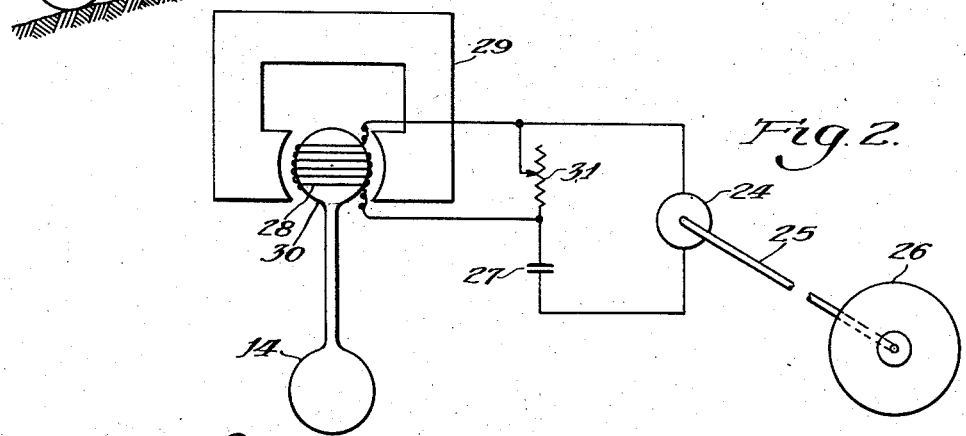
Figure 2 represents in schematic form a diagram of the elements used in carrying out the invention.

In Figure 2 I have shown a compensating device which will accomplish the desired result. A small generator 24, preferably direct current, is coupled by means of a flexible cable 25 or other well known means to a measuring wheel 26 which may be one of the wheels supporting the vehicle 11 or may be a special measuring wheel, in such a fashion that the rotation of the armature of the generator 24 is in direct synchronism with the movement of the vehicle along the path. The output voltage of this generator is, therefore, dependent upon the speed with which the vehicle is traveling. This voltage is applied to a circuit which takes the time derivative of the voltage. The preferred (but not the only) form of this circuit consists of a condenser 27 and a coil of wire 28. This coil 28 is attached to the pendulum so that the pendulum axis of rotation passes through two opposite sides of the coil in such a fashion that the coil is approximately symmetrical to the axis. As shown in Figure 2 the leads to this coil are flexible and are very light so that they produce a negligible force upon the coil and pendulum. If desired these leads may include hairsprings such as are used to conduct current to an ammeter coil. The coil is mounted in a magnetic field furnished by a magnet 29. Preferably a ferromagnetic cylinder 30 is mounted within the coil with its axis substantially coincident with the axis of rotation of the pendulum so that the magnetic field due to the magnet 29 is approximately radial in the region where the sides of the coil are located.

The coil resistance is small compared with the impedance of the condenser 27 at the frequencies involved. The current flowing into the condenser is proportional to the change of voltage across it. Stated mathematically, the current I is proportional to $de/dt$ where $de$ is a change of voltage applied to the condenser in the time $dt$. The current to the coil is therefore proportional to $de/dt$ where $e$ is the generated voltage of generator 24. Since the voltage of this generator is proportional to the velocity of the car it is proportional to $dS/dt$ where $dS$ is the increment of distance traveled in the time $dt$. The coil current is therefore proportional to $d^2S/dt^2$, i. e. is proportional to the acceleration of the vehicle.

Due to the reaction of current flowing in this coil 28 with the magnetic field, a torque is applied to the coil tending to rotate it about the pendulum axis. Since the coil is attached to the pendulum the coil in turn applies this torque to the pendulum itself. This torque is directly proportional to the current flowing through the coil and is therefore proportional to $d^2S/dt^2$. Therefore, the torque applied to the pendulum is directly proportional to the acceleration of the car $d^2S/dt^2$. The force on the suspended pendulum mass is also proportional to the vehicle acceleration $d^2S/dt^2$. Thus by passing current into the coil in such a direction that the torque due to the current in the coil opposes the torque due to the car acceleration, and by properly adjusting the magnitude of this current it is possible to compensate exactly for changes in the acceleration of the car, as such accelerations occur. This adjustment in magnitude of the current is made by shunting across the coil an adjustable resistor 31 which is adjusted until current of exactly the right magnitude flows in the coil 28.

One preferred form of the device is shown in Figure 3 in connection with a particularly desirable form of elevation indicator. The elevation indicator per se is not a part of this particular invention and hence is not discussed in detail. It is sufficient to state here that the pendulum in this case is a light disc 32 of metal which is torsionally suspended on two threads of iso-elastic material 33 under tension. The disc is supported slightly off-center so that it acts as a long period pendulum. Attached to the shaft supporting the disc 32 is a mirror 15. The light from a shielded electric lamp 16 mounted on a rotatable support 34 shines on the mirror 15 and is reflected into a photocell 35 mounted in a shield 36 on a support 37. The output from the photocell is amplified by an amplifier (not shown) which in turn drives an electric motor 38 whenever the amount of light on the photocell 35 varies from that which is present when the vehicle is horizontal. The rotations of the motor 38 are imparted to a lead screw 39 which in turn is threaded into a block 40. In this block is cut a vertical slot which engages a stationary pin in the rotatable support 34. The block 40 is propelled by the rotation of lead screw 39 and is prevented from rotating by the sliding contact of the block with the side of support 34. Thus as soon as the light from the photocell departs from its normal value the motor 38 moves block 40, which rotates the support 34 about an axis coinciding with the axis of the pendulum (since it is supported in a bearing 41 mounted on the support 42 which supports the pendulum) until the light from the lamp 16 reflected onto the photocell returns to its normal value. The motion of the block 40 is directly proportional to the sine of the angle of inclination of the vehicle and by mechanical means (not shown) the motion of this block is constantly multiplied by the distance traveled to produce a result directly proportional to the elevation of the vehicle. The particular type of elevation meter forms no part of this invention and therefore this device is not described with particularity.

The coil 28 is mounted integral with the disc 32 to rotate about the axis defined by the wires 33. The magnet 29 is mounted on the support 43 in such a fashion that the coil 28 is directly in the field of the magnet. The ferromagnetic cylinder 30 is likewise supported inside the coil 28 with its axis coincident with the axis of the pendulum. The leads to the coil are attached to a cable 44 which is brought out at the base of the support 43 where it is attached to the adjusting resistor 31 and the condenser 27. The leads from the adjusting resistor and the condenser are then attached to the two leads of cable 45 which go to the generator 24 (not shown in this figure). Enough has been stated about the operation of the device so that it is apparent that upon proper adjustment of the resistor 31 the torque applied to the disc 32 by the current flowing coil 28, which is directly proportional to the acceleration of the car, can be made to compensate exactly for the inertia torque applied to the disc 32 by acceleration of the car. In practice I have found that this arrangement works very satisfactorily and that it is possible to compensate for acceleration of the car to such a point that errors in elevation are less than one foot in a mile.

The arrangement shown by Figure 2 is satisfactory for most cases where errors of the order of one or two feet to the mile can be tolerated; however, where more precise results are required, compensation must be provided for the direct current leakage of the condenser used for taking the derivative of the velocity. In actual practice the capacity of these condensers is of the order of 100 microfarads and even with the best types of commercial condensers leakage of the order of one or two microamperes is present. This leakage introduces errors in elevation and its effect can be balanced out by the bridge circuit shown in Figure 4 where resistances 46, 47, 48 and 49 are connected in the form of the well known Wheatstone bridge arrangement which can be balanced by varying resistor 48 so that no direct current flows through coil 28 and shunt resistor 31. Resistor 46 includes the leakage resistance of condenser 27 so that leakage current due to this cause does not traverse the balancing coil 28.

However, when voltage changes take place due to changes in the speed of the vehicle, the bridge is unbalanced and currents substantially proportional to $de/dt$ traverse the compensating coil 28.

An alternative method of obtaining the derivative is illustrated by Figure 5 where a transformer with primary winding 51 and secondary winding 52 is used for obtaining the derivative of the vehicle velocity. Here the resistance of the circuit including generator 24 and resistor 50 is large compared with the impedance of primary winding 51 so that the current flowing through primary winding 51 is substantially proportional to the voltage of the generator, and hence is proportional to the speed of the car. Now when there is a change in the primary current flowing in coil 51 caused by change in speed of the vehicle the voltage resulting in the secondary coil 52 is proportional to $di/dt$, and assuming that the resistance across the secondary winding 52 is large, the current flowing in this circuit is substantially proportional to the acceleration of the car.

It is apparent that vacuum tubes may be used to amplify the effect of either of the derivating circuits described.

Those skilled in the art will recognize that there are other mechanical electric analogues of the device shown so that it is possible to vary parts of the apparatus without departing from the spirit of the invention. The invention is best defined by the scope of the appended claims.

I claim:

1. In an elevation meter including a pendulum mounted on a wheeled vehicle with the axis of rotation approximately transverse to the direction of travel of said vehicle and means for measuring the angle of inclination of said pendulum relative to its position when said vehicle is horizontal, the improvement consisting of means for compensating for torque on said pendulum produced by acceleration of said vehicle in the direction of motion of said vehicle, said means comprising a direct current generator coupled to one of the wheels of said vehicle and adapted to rotate therewith, an electric circuit energized from said generator, said circuit including a coil and adapted to produce a current in said coil directly proportional to the rate of change of output of said generator, said coil being attached to said pendulum so that said axis passes through two opposite sides of said coil and so that said coil is approximately symmetrical to said axis, and a magnet mounted with its poles adjacent said coil, on a base fixed relative to said vehicle in such a manner that said coil lies in the field of said magnet.

2. An improvement in an elevation meter as set forth in claim 1 including an adjustable resistance in shunt with said coil, and a ferromagnetic cylinder mounted within said coil with its axis substantially coinciding with said axis of rotation of said pendulum.

3. Apparatus according to claim 1 in which said circuit includes an electric condenser in series with said coil and said generator.

4. Apparatus according to claim 1 in which said circuit includes a transformer, and a resistance connected in series with the primary of said transformer and said generator, the secondary of said transformer being connected across said coil.

5. Apparatus according to claim 1 in which said circuit includes an electric condenser and a first resistance connected in series across said generator, a second resistance and a third resistance connected in series across said generator, the terminals of said coil being connected between said second and said third resistance, and between said condenser and said first resistance, respectively, said resistances being of such values that as long as the output of said generator is constant zero current flows in said coil.

6. In combination, a pendulum mounted on a wheeled vehicle and adapted to rotate about an axis substantially transverse to the average direction of motion of said wheeled vehicle, an electric generator coupled to one of the wheels of said vehicle and adapted to rotate at a rate directly proportional to the rate of rotation of the wheel to which it is coupled, a torque compensator including two elements, one of which is a means for producing a relatively constant magnetic field and the other one of which is a coil, one of said two elements being attached to said vehicle and the other of said two elements being attached to and adapted to rotate with said pendulum in said magnetic field, and an electric circuit including said coil, said circuit being coupled to the output of said generator and adapted to produce a current in said coil substantially directly proportional at all times to the time derivative of the output of said generator, whereby said current in said coil reacts with said magnetic field to produce a torque on said pendulum at all times substantially completely compensating for the torque on said pendulum due to inertia forces caused by acceleration of said vehicle transverse to said axis.

RAYMOND T. CLOUD.